US012660905B2

(12) United States Patent
Henshall

(10) Patent No.: US 12,660,905 B2
(45) Date of Patent: Jun. 23, 2026

(54) ADJUSTABLE TOOL HOLDER FOR PERSONAL CARE APPLICATIONS

(71) Applicant: Cheryl Henshall, Cranston, RI (US)

(72) Inventor: Cheryl Henshall, Cranston, RI (US)

(*) Notice: Subject to any disclaimer, the term of this patent is extended or adjusted under 35 U.S.C. 154(b) by 290 days.

(21) Appl. No.: 18/604,131

(22) Filed: Mar. 13, 2024

(65) Prior Publication Data

US 2024/0306794 A1 Sep. 19, 2024

Related U.S. Application Data

(60) Provisional application No. 63/452,732, filed on Mar. 17, 2023.

(51) Int. Cl.

| | |
|---|---|
| ***B25G 1/08*** | (2006.01) |
| ***A45D 29/02*** | (2006.01) |
| ***A45D 29/04*** | (2006.01) |
| ***A45D 29/16*** | (2006.01) |
| ***A45D 34/04*** | (2006.01) |

(52) U.S. Cl.

CPC .......... *A45D 34/042* (2013.01); *A45D 29/02* (2013.01); *A45D 29/04* (2013.01); *A45D 29/16* (2013.01); *B25G 1/08* (2013.01)

(58) Field of Classification Search

CPC ... B25G 1/08; B25G 3/00; B25G 3/12; B25G 3/08

See application file for complete search history.

(56) References Cited

U.S. PATENT DOCUMENTS 1,171,294 A * 2/1916 Yager .................... F16B 39/06 411/293
6,823,555 B2 * 11/2004 Warren .................. A47K 7/028 15/210.1
8,875,337 B2 * 11/2014 Tacoma ................. B65D 71/06 15/210.1
10,405,704 B2 * 9/2019 Shaw .................... A47K 7/03

FOREIGN PATENT DOCUMENTS

CN 106612626 A * 5/2017 .............. A01D 1/06
WO WO-2020243495 A1 * 12/2020 ............ F21V 33/008

* cited by examiner

*Primary Examiner* — Shay Karls
(74) *Attorney, Agent, or Firm* — Joel Douglas

(57) ABSTRACT

A device for holding a pedicure tool, the device including a telescoping handle having one end including a handle grip and a second end having a tool attachment holder engageable with the personal care or pedicure tool. The pedicure tool is attachable and removable from the tool attachment holder. The pedicure tool may be a small toenail polish applicator brush, emery board, pumice stone, large/cleaning brush and a sponge. or any pedicure tool or appliance which may be used on the foot. The telescoping handle is continuously variable in length from a fully collapsed position whereby the pedicure tool is positioned at a minimum distance from the handle to a fully extended position whereby the pedicure tool is positioned at a maximum distance from the handle.

1 Claim, 10 Drawing Sheets

ADJUSTABLE TOOL HOLDER FOR PERSONAL CARE APPLICATIONS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

Trademarks used in the disclosure of the invention, and the applicants, make no claim to any trademarks referenced.

CROSS-REFERENCE TO RELATED APPLICATIONS

This application is a Utility Patent application claiming priority to U.S. Provisional Patent Application Ser. No. 63/452,732, filed on Mar. 17, 2023, which is incorporated by reference herein in its entirety.

BACKGROUND OF THE INVENTION

Field of the Invention

The invention relates to the field of personal care tools and, more specifically, to adjustable tool holders for foot care applications.

Description of Related Art

Currently the state of the art includes individual foot care/pedicure tools which are difficult to use when an individual cannot reach down to work on their feet because of medical or other conditions which limit mobility.

Foot care is an integral part of personal hygiene and wellness. It involves various tasks such as cleaning, exfoliating, and nail care. These tasks often require the use of specific tools such as brushes, emery boards, pumice stones, and sponges.

The use of these tools can sometimes be challenging due to the physical positioning and reachability issues, especially for individuals with limited mobility or physical discomfort. Therefore, the design of the tool holder plays a pivotal role in facilitating the use of these tools.

SUMMARY OF THE INVENTION

In a first implementation of the invention includes a device and a method for maintaining foot health/performing self-pedicures for those with limited mobility or unable to reach their feet.

The instant invention solves the following problem. As a person ages the ability to bend over is reduced and the individual still has to maintain body parts which are distal from the upper torso. This problem is exacerbated with respect to foot care. The instant invention solves the problem by providing a tool which is capable of having different attachments which can be used for foot care and the shaft extends to various lengths so that the user can use the attachments to provide foot care regardless of the degree of mobility that the patient has with regard to their ability to bend or squat. The various attachments can include a pumice stone, emery board, brush, toenail painting brush or sponge. The instant invention enables a person with limited mobility who cannot reach their feet to perform a home-style pedicure and maintain/improve their foot health.

According to an aspect of the present disclosure, the device includes a telescoping handle having one end including a handle grip and a second end opposite the first end. The second end is engageable with the foot care tool, which is attachable and removable from the device's second end. The foot care tool is selected from a group consisting of a small toenail polish applicator brush, an emery board, a pumice stone, a large/cleaning brush, and a sponge. The telescoping handle is continuously variable in length from a fully collapsed position whereby the foot care tool is positioned at a minimum distance from the handle to a fully extended position whereby the foot care tool is positioned at a maximum distance from the handle.

According to other aspects of the present disclosure, the device may include one or more of the following features. The handle grip may be made from a soft, non-slip material such as rubber or silicone for comfortable and secure grip. The telescoping handle may be made from a lightweight, durable material such as aluminum or carbon fiber. The device may further include a storage compartment for storing the foot care tools when not in use. The device may also include a locking mechanism to secure the handle at a desired length. The device may further include a light source, such as an LED light, near the second end to illuminate the foot during use. The foot care tool can be selected from a wider range of tools, including a cuticle pusher, a nail clipper, a foot file, a callus remover, and a foot scrubber.

BRIEF DESCRIPTION OF DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
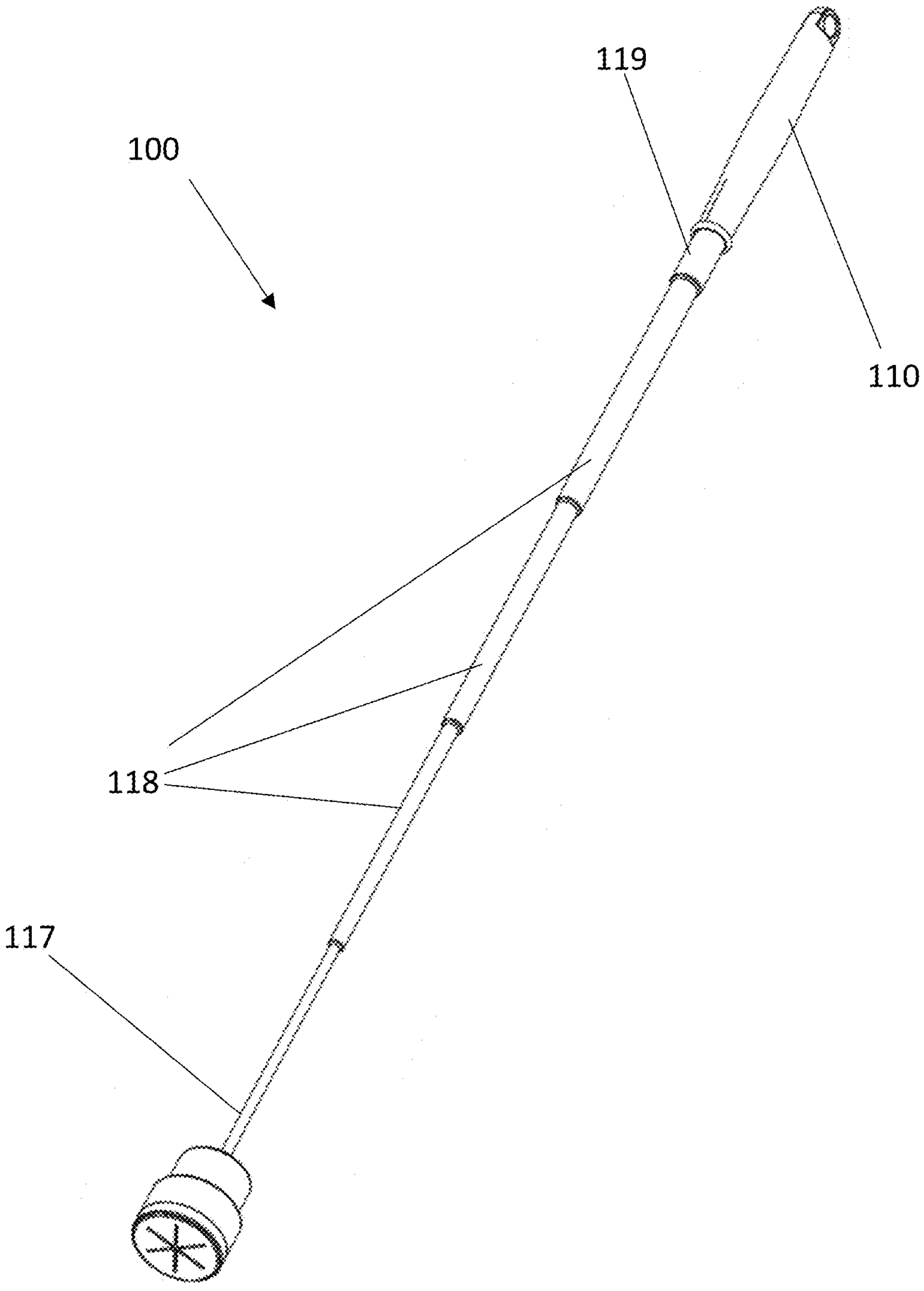
FIG. 1 is a bottom front left perspective view of the adjustable tool holder according to the present invention.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art however that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token however, no single feature or features of any described embodiment should be considered essential to every embodiment of the invention, as other embodiments of the invention may omit such features.

In this application the use of the singular includes the plural unless specifically stated otherwise and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure be considered as an example of the principles of the invention and not intended to limit the invention to the specific embodiments shown and described.

The instant invention can be used by a user to provide both health treatments for the user's feet or a self-administered pedicure. A pedicure is a treatment to improve the appearance and health of the feet and toenails. The treatment can include cutting, shaping, and often painting of the nails, removal of the cuticles, and massage of the foot or softening of the skin.

The terms foot care and pedicure are used interchangeably to mean providing foot care for a user's foot using the instant invention.

The term user, person and individual as used in the specification is meant to mean a person who is using the instant invention.

A telescoping handle is a handle that can be extended or retracted to adjust its length. In this patent, the telescoping handle is continuously variable in length from a fully collapsed position to a fully extended position.

A small toenail polish applicator brush is a small brush specifically designed for the application of nail polish to toenails.

An emery board is a tool used for filing and shaping nails. It typically consists of a thin piece of cardboard coated with powdered emery, a type of abrasive mineral.

A pumice stone is a light, porous volcanic rock that is used as an abrasive and in this context, is used for removing hard skin on the feet.

A large/cleaning brush is a brush with larger bristles used for cleaning and scrubbing the feet.

A sponge is a porous material used for cleaning and scrubbing the feet, often used with soap or other cleaning agents.

A fully collapsed position is the state of the telescoping handle when it is retracted to its shortest length. A fully extended position is the state of the telescoping handle when it is extended to its longest length.

Minimum distance refers to the shortest distance between the handle grip and the foot care tool when the telescoping handle is in the fully collapsed position.

Maximum distance refers to the longest distance between the handle grip and the foot care tool when the telescoping handle is in the fully extended position.

The present disclosure pertains to the field of personal care tool design, specifically focusing on devices for holding foot care tools. These devices are designed to facilitate various foot care tasks such as cleaning, exfoliating, and nail care, which often require the use of specific tools. The disclosed device includes a telescoping handle that can be adjusted in length, providing flexibility in terms of reach and accommodating users with different physical capabilities and preferences.

In some aspects, the device includes a handle grip at one end and a second end designed to engage with the foot care tool. The foot care tool can be attached and removed from the device's second end, allowing the user to switch between different tools as per their foot care routine. The foot care tool may include a small toenail polish applicator brush, an emery board, a pumice stone, a large/cleaning brush, and a sponge, among others.

The telescoping handle of the device is continuously variable in length from a fully collapsed position to a fully extended position. This feature allows the user to adjust the distance between the handle grip and the foot care tool, providing flexibility in terms of reach and making it easier for the user to access different parts of the foot without straining or bending awkwardly.

In some cases, the handle grip may be made from a soft, non-slip material such as rubber or silicone for a comfortable and secure grip. The telescoping handle may be made from a lightweight, durable material such as aluminum or carbon fiber. The device may also include additional features such as a storage compartment for storing the foot care tools when not in use, a locking mechanism to secure the handle at a desired length, and a light source near the second end to illuminate the foot during use.

The disclosed device provides a comprehensive solution for foot care, covering tasks from nail care to exfoliation and cleaning. Its design and features aim to enhance user comfort and convenience, making foot care tasks easier and more efficient.

The device for holding a foot care tool, in some aspects, includes a telescoping handle. This handle may have one end that includes a handle grip and a second end opposite the first end. The second end may be engageable with the foot care tool. The foot care tool may be attachable and removable from the device's second end. This feature allows the user to switch between different tools as per their foot care routine. The foot care tool may include a small toenail polish applicator brush, an emery board, a pumice stone, a large/cleaning brush, and a sponge, among others.

The telescoping handle of the device is a notable feature. In some cases, the telescoping handle is continuously variable in length from a fully collapsed position to a fully extended position. This feature allows the user to adjust the distance between the handle grip and the foot care tool. This provides flexibility in terms of reach and makes it easier for the user to access different parts of the foot without straining or bending awkwardly.

In some embodiments, the handle grip of the telescoping handle may be made from a soft, non-slip material such as rubber or silicone. This material choice may provide a comfortable and secure grip for the user. In other embodiments, the telescoping handle may be made from a lightweight, durable material such as aluminum or carbon fiber. This material choice may provide a balance between durability and ease of use, making the device suitable for regular use.

In some cases, the handle grip of the device may be made from a soft, non-slip material such as rubber or silicone. This material choice may provide a comfortable and secure grip for the user. In other cases, the telescoping handle of the device may be made from a lightweight, durable material such as aluminum or carbon fiber. This material choice may provide a balance between durability and ease of use, making the device suitable for regular use.

In some embodiments, the telescoping handle is continuously variable in length from a fully collapsed position whereby the pedicure tool is positioned at a minimum distance from the handle to a fully extended position whereby the pedicure tool is positioned at a maximum distance from the handle. This feature allows the user to adjust the distance between the handle grip and the foot care tool, providing flexibility in terms of reach and making it easier for the user to access different parts of the foot without straining or bending awkwardly.

In some cases, the telescoping handle may be made from a lightweight, durable material such as aluminum or carbon fiber. This material choice may provide a balance between durability and ease of use, making the device suitable for regular use.

In some aspects, the handle grip of the telescoping handle may be composed of a soft, non-slip material such as rubber or silicone. This material choice may provide a comfortable and secure grip for the user. The softness of the material may enhance the comfort of the user during prolonged use of the device, while the non-slip property of the material may ensure a secure grip, reducing the risk of the device slipping from the user's hand during use.

In some cases, the non-slip material of the handle grip may include a textured surface. This textured surface may further enhance the grip by providing additional friction between the user's hand and the handle grip. The textured surface may be formed by a variety of methods, such as embossing, etching, or molding, and may include patterns such as ridges, grooves, or bumps.

In other aspects, the handle grip of the device may be made from a soft, non-slip material such as rubber or silicone. This material choice may provide a comfortable and secure grip for the user. The softness of the material may enhance the comfort of the user during prolonged use of the device, while the non-slip property of the material may ensure a secure grip, reducing the risk of the device slipping from the user's hand during use.

In some embodiments, the handle grip of the telescoping handle may be composed of a soft, non-slip material such as rubber or silicone. This material choice may provide a comfortable and secure grip for the user. The softness of the material may enhance the comfort of the user during prolonged use of the device, while the non-slip property of the material may ensure a secure grip, reducing the risk of the device slipping from the user's hand during use.

In some aspects, the telescoping handle of the device may be composed of a lightweight, durable material such as aluminum or carbon fiber. The use of such materials may contribute to the overall durability of the device, ensuring that it can withstand regular use without compromising its structural integrity. Furthermore, the lightweight nature of these materials may enhance the ease of use of the device, reducing the strain on the user's hand during prolonged use.

In some cases, the telescoping handle may be made from aluminum. Aluminum is known for its lightweight and durable properties, making it an ideal material for the handle. It is resistant to corrosion and can withstand the rigors of regular use, ensuring the longevity of the device.

In other cases, the telescoping handle may be made from carbon fiber. Carbon fiber is a material known for its high strength-to-weight ratio, making it an excellent choice for the handle. Despite its lightweight nature, carbon fiber exhibits high durability and resistance to wear and tear, contributing to the robustness and longevity of the device.

In some embodiments, the telescoping handle may be composed of a combination of aluminum and carbon fiber. This combination may leverage the beneficial properties of both materials, resulting in a handle that is both lightweight and extremely durable. The use of these materials may enhance the overall user experience by providing a balance between ease of use and durability.

In other aspects, the telescoping handle may be made from other lightweight, durable materials. The choice of material may depend on various factors such as cost, availability, and specific user requirements. Regardless of the material used, the telescoping handle is designed to provide a comfortable and efficient means of holding and manipulating the foot care tool.

The second end of the telescoping handle, in some aspects, is designed to engage with the foot care tool. This engagement may be facilitated through various mechanisms such as a threaded connection, a snap-fit connection, a magnetic connection, or any other suitable attachment mechanism. The specific design of the engagement mechanism may depend on the type of foot care tool being used and the specific requirements of the user.

In some cases, the foot care tool may be easily attachable and removable from the device's second end. This feature allows the user to switch between different tools as per their foot care routine. The foot care tool may include a small toenail polish applicator brush, an emery board, a pumice stone, a large/cleaning brush, and a sponge, among others.

The ease of attaching and removing these tools may enhance the versatility of the device, allowing it to cater to a wide range of foot care tasks.

In some embodiments, the foot care tool can be selected from a wider range of tools. These may include a cuticle pusher, a nail clipper, a foot file, a callus remover, and a foot scrubber, among others. This expanded selection of tools may provide a more comprehensive solution for foot care, covering tasks from nail care to exfoliation and cleaning. The ability to attach and remove these tools from the device's second end may allow the user to customize their foot care routine according to their specific requirements and preferences.

In other cases, the foot care tool can be selected from a wider range of tools, including a cuticle pusher, a nail clipper, a foot file, a callus remover, and a foot scrubber. This expanded selection of tools may provide a more comprehensive solution for foot care, covering tasks from nail care to exfoliation and cleaning. The ability to attach and remove these tools from the device's second end may allow the user to customize their foot care routine according to their specific requirements and preferences.

The device for holding a foot care tool, in some aspects, is designed to engage with a range of foot care tools. These tools may include, but are not limited to, a small toenail polish applicator brush, an emery board, a pumice stone, a large/cleaning brush, and a sponge. Each of these tools may serve a specific purpose in the foot care routine. For instance, the small toenail polish applicator brush may be used for the precise application of nail polish, the emery board may be used for filing and shaping the nails, the pumice stone may be used for removing hard skin, the large/cleaning brush may be used for cleaning the feet, and the sponge may be used for scrubbing the feet.

In some cases, the foot care tool can be selected from a wider range of tools. These may include a cuticle pusher, a nail clipper, a foot file, a callus remover, and a foot scrubber. The cuticle pusher may be used for pushing back the cuticles, the nail clipper for trimming the nails, the foot file for smoothing rough skin, the callus remover for removing calluses, and the foot scrubber for exfoliating the skin. This expanded selection of tools may provide a more comprehensive solution for foot care, covering tasks from nail care to exfoliation and cleaning.

In other aspects, the foot care tool can be selected from a wider range of tools, including a cuticle pusher, a nail clipper, a foot file, a callus remover, and a foot scrubber. This expanded selection of tools may provide a more comprehensive solution for foot care, covering tasks from nail care to exfoliation and cleaning. The ability to attach and remove these tools from the device's second end may allow the user to customize their foot care routine according to their specific requirements and preferences.

The foot care tools may be easily attachable and removable from the device's second end. This feature allows the user to switch between different tools as per their foot care routine. The ease of attaching and removing these tools may enhance the versatility of the device, allowing it to cater to a wide range of foot care tasks.

In some aspects, the device for holding a foot care tool may include a storage compartment for storing the foot care tools when not in use. This feature may provide a convenient and organized way to store the foot care tools, keeping them readily accessible for the user. The storage compartment may be designed to securely hold the tools, preventing them from falling out or getting lost when the device is not in use.

In some cases, the storage compartment may be integrated into the handle of the device. This integration may save space and enhance the compactness of the device, making it more portable and easier to store. The integrated storage compartment may be located at a convenient location on the handle, such as near the handle grip or the second end, providing easy access to the foot care tools.

In other aspects, the storage compartment may be a separate component that is attachable to the handle. This design may allow the user to detach the storage compartment when it is not in use, reducing the overall size of the device for easier storage or transport. The attachable storage compartment may be designed to securely attach to the handle, preventing it from accidentally detaching during use.

In some embodiments, the storage compartment may be designed to hold a specific number of foot care tools. The compartment may include individual slots or holders for each tool, keeping them organized and preventing them from damaging each other. In other cases, the storage compartment may be a general-purpose compartment that can hold a variety of foot care tools, providing flexibility for the user to store their preferred tools.

In other cases, the device may include multiple storage compartments for storing different types of foot care tools. Each compartment may be designed to hold a specific type of tool, such as a small toenail polish applicator brush, an emery board, a pumice stone, a large/cleaning brush, or a sponge. This feature may provide a more organized storage solution, making it easier for the user to find and select the desired tool.

In some embodiments, the storage compartment may be designed with a closure mechanism, such as a lid, a zipper, or a snap closure, to secure the foot care tools inside the compartment. This feature may prevent the tools from falling out of the compartment when the device is being transported or stored. The closure mechanism may be designed to be easily opened and closed by the user, providing quick and easy access to the foot care tools.

In some aspects, the device for holding a foot care tool may include a locking mechanism that allows the handle to be secured at a desired length. This feature may provide the user with the ability to adjust the length of the handle according to their comfort and reach, and then lock it in place to maintain that length during use. The locking mechanism may be designed to be easily operated by the user, providing a quick and efficient way to adjust and secure the handle length.

The locking mechanism may be located at various positions along the length of the telescoping handle. In some cases, it may be located near the handle grip, providing easy access for the user. In other cases, it may be located near the second end of the handle, or at any other suitable location along the length of the handle.

The locking mechanism may be of various types. In some cases, it may be a twist-lock mechanism, where the user twists a part of the handle to lock or unlock the handle length. In other cases, it may be a push-button mechanism, where the user pushes a button to lock or unlock the handle length. Other types of locking mechanisms, such as a lever-lock mechanism, a clamp-lock mechanism, or a ratchet-lock mechanism, may also be used.

In some embodiments, the locking mechanism may include a series of notches or grooves along the length of the handle, and a locking element that engages with these notches or grooves to lock the handle at a desired length. The locking element may be spring-loaded or otherwise biased to engage with the notches or grooves, and may be disengaged by the user to adjust the handle length.

In other aspects, the locking mechanism may include a friction lock, where the handle is held at a desired length by friction between two or more parts of the handle. The friction may be adjusted by the user to lock or unlock the handle length.

In some cases, the locking mechanism may be designed to provide a secure lock that prevents the handle from accidentally changing length during use. This feature may enhance the stability and reliability of the device, ensuring that the handle stays at the desired length even under the pressure of use.

In other cases, the locking mechanism may be designed to provide a smooth and easy adjustment of the handle length. This feature may enhance the user experience by allowing the user to easily and quickly adjust the handle length as per their comfort and reach.

In some embodiments, the locking mechanism may be designed to be durable and resistant to wear and tear, ensuring that it can withstand regular use without compromising its functionality. The choice of materials and design of the locking mechanism may contribute to its durability and reliability.

In other aspects, the locking mechanism may be designed to be easily operated even by users with limited hand strength or dexterity. This feature may make the device more accessible and user-friendly, catering to a wide range of users with different physical capabilities.

In some aspects, the device for holding a foot care tool may include a light source near the second end. This light source may be designed to illuminate the foot during use, enhancing visibility and making it easier for the user to perform foot care tasks. The light source may be particularly useful in low-light conditions, where it may be difficult for the user to see the foot clearly.

The light source may be of various types. In some cases, it may be an LED light, which is known for its high brightness, low power consumption, and long lifespan. The LED light may be powered by a battery, which may be rechargeable or replaceable. The device may include a switch or a button to turn the LED light on or off, allowing the user to control the illumination as per their requirements.

In other cases, the light source may be a different type of light, such as an incandescent light, a fluorescent light, or a halogen light. The choice of light source may depend on various factors such as brightness, power consumption, heat generation, and cost.

In some embodiments, the light source may be positioned in such a way that it illuminates the foot care tool and the area of the foot being treated. This positioning may enhance the visibility of the foot care task, making it easier for the user to perform the task accurately and efficiently.

In other aspects, the light source may be adjustable, allowing the user to adjust the direction and intensity of the light. This feature may provide the user with the flexibility to customize the illumination according to their specific requirements and preferences.

In some cases, the light source may be designed to be durable and resistant to wear and tear, ensuring that it can withstand regular use without compromising its functionality. The choice of materials and design of the light source may contribute to its durability and reliability.

In other cases, the light source may be designed to be easily operated even by users with limited hand strength or dexterity. This feature may make the device more accessible and user-friendly, catering to a wide range of users with different physical capabilities.

Variations

A device for holding a foot care tool, the device comprising a flexible handle having one end including a handle grip and a second end opposite the first end, the second end engageable with the foot care tool, the foot care tool being attachable and removable from the device second end, the pedicure tool selected from a group consisting of a small toenail polish applicator brush, an emery board, a pumice stone, a large/cleaning brush, and a sponge. The flexible handle can be bent to various angles to allow the user to reach different parts of the foot with ease.

2. A device for holding a foot care tool, the device comprising a telescoping handle made from a lightweight, durable material such as aluminum or carbon fiber. The handle has one end including a handle grip and a second end opposite the first end, the second end engageable with the foot care tool, the foot care tool being attachable and removable from the device second end.

3. A device for holding a foot care tool, the device comprising a telescoping handle having one end including a handle grip made from a soft, non-slip material such as rubber or silicone for comfortable and secure grip. The second end opposite the first end is engageable with the foot care tool, the foot care tool being attachable and removable from the device second end.

4. A device for holding a foot care tool, the device comprising a telescoping handle having one end including a handle grip and a second end opposite the first end, the second end engageable with the foot care tool, the foot care tool being attachable and removable from the device second end. The foot care tool can be selected from a wider range of tools, including a cuticle pusher, a nail clipper, a foot file, a callus remover, and a foot scrubber.

5. A device for holding a foot care tool, the device comprising a telescoping handle having one end including a handle grip and a second end opposite the first end, the second end engageable with the foot care tool, the foot care tool being attachable and removable from the device second end. The device may also include a storage compartment for storing the foot care tools when not in use.

6. A device for holding a foot care tool, the device comprising a telescoping handle having one end including a handle grip and a second end opposite the first end, the second end engageable with the foot care tool, the foot care tool being attachable and removable from the device second end. The device may also include a locking mechanism to secure the handle at a desired length.

7. A device for holding a foot care tool, the device comprising a telescoping handle having one end including a handle grip and a second end opposite the first end, the second end engageable with the foot care tool, the foot care tool being attachable and removable from the device second end. The device may also include a light source, such as an LED light, near the second end to illuminate the foot during use.

A variety of tools are required to cut, shape, paint or otherwise care for or repair toenails including without limitation toe nail nippers/scissors, cuticle nippers/scissors, nail clippers, tweezers, nail files, cuticle pushers, cuticle knives, nail cleaner, and hoof sticks. As a result, a pedicure set typically includes multiple tools, each of which can perform one or more of the functions necessary to perform a pedicure. The instant invention envisions the incorporation of different tools and devices that can be used by an individual to promote foot care.

The instant invention is a combination nail/footcare tool. The combination tool can include a plurality of different tools such as pumice stone, emery board, brush, toenail painting brush, sponge, nail clippers, cuticle scissors, tweezers, a cuticle pusher, cuticle nippers, and a file. The tools are recoverable attached to a handle that is capable of a variety of lengths by simply adjusting the handle length from the collapsed state to the extended state. The tools are removably attached to the shaft by any of the following attachment methods including but not limited to threaded connector, clamp, bayonet stile connector or swivel connector.

The present invention is directed to a telescopic foot care device that is configured to allow a user to provide care for their feet from either a standing or sitting position.

The assembly of all the items into a kit makes the installation simple and easy for the user because the parts necessary to administer foot care including nail care and cleaning are available in one kit with an extendable handle. A kit of the instant invention would include at least one extendable handle and removable tools including but not limited to pumice stone, emery board, cleaning brush, toenail painting brush, sponge, nail clippers, cuticle scissors, tweezers, a cuticle pusher, cuticle nippers, and a file.

The instant invention is a device for holding a foot care tool, the device comprising:

a telescoping handle having one end including a handle grip and a second end opposite the first end, the second end engageable with the foot care tool, the foot care tool being attachable and removable from the device second end, the foot care tool selected from a group consisting of a small toenail polish applicator brush, an emery board, a pumice stone, a large/cleaning brush and a sponge.

The telescoping handle is continuously variable in length from a fully collapsed position whereby the pedicure tool is positioned at a minimum distance from the handle to a fully extended position whereby the pedicure tool is positioned at a maximum distance from the handle.

Figure 2:
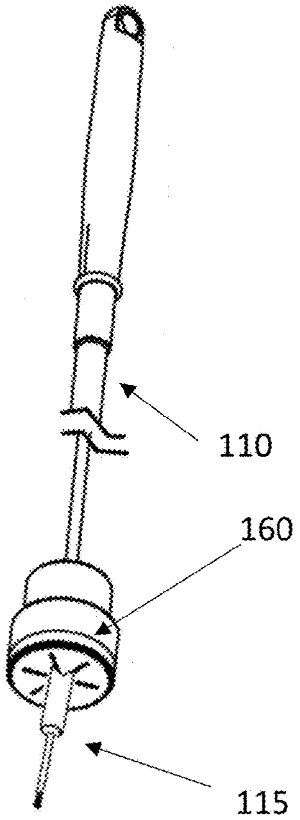
FIG. 2 is a perspective view of the adjustable tool holder with small toenail polish applicator brush.

Referring now to the drawings FIGS. 1-17, and more particularly to FIG. 1, there is shown a perspective view of the adjustable tool holder 100. The adjustable tool holder 100 includes and extendable handle 110 and a tool attachment holder 160. The extendable handle 110 includes a handle 119 having an outer handle grip 114. The extendable handle 110 includes a bottom section 117 having the tool attachment holder 160 on one end. A plurality of extension sections 118 are collapsible within the handle 119 and when in the extended position, The plurality of extension sections 118 are disposed between the handle 119 and the bottom section 117. FIG. 2 shows the adjustable tool holder 100 with a small toenail polish applicator brush 115, extendable handle 110 and tool attachment holder 160. The small toenail polish applicator brush 115 is attached to the tool attachment holder 160 and the tool attachment holder 160 can be selected from the group comprising of threaded connector, clamp, bayonet stile connector or swivel connector. The user can removably attach the small toenail polish applicator brush 115 to the tool attachment holder 160.

Figure 3:
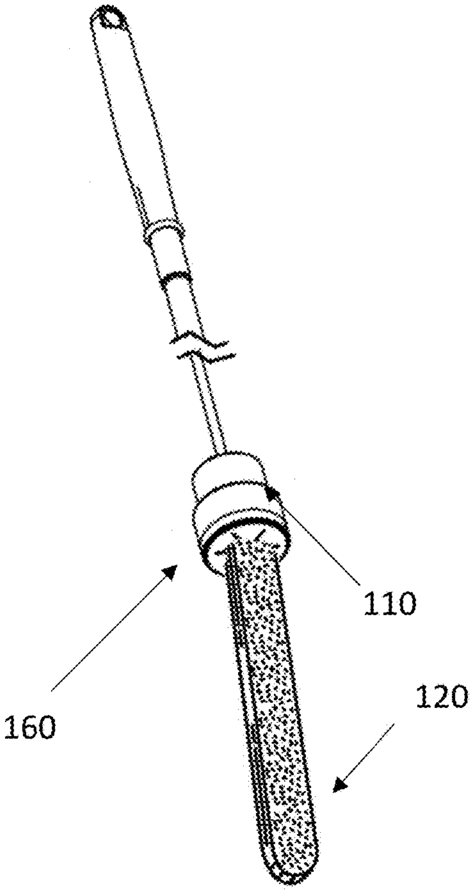
FIG. 3 is a perspective view of the adjustable tool holder with an emery board.

FIG. 3 is a picture of the instant invention with an emery board 120, extendable handle 110 and tool attachment holder 160. The user can removably attach the emery board 120 to the tool attachment holder 160.

Figure 4:
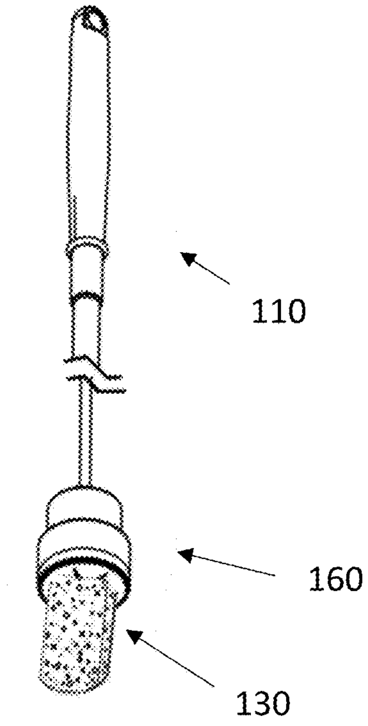
FIG. 4 is a perspective view of the adjustable tool holder with a pumice stone.

FIG. 4 is a picture of the instant invention with a pumice stone 130, extendable handle 110 and tool attachment holder 160. The user can removably attach the pumice stone 130 to the tool attachment holder 160.

Figure 5:
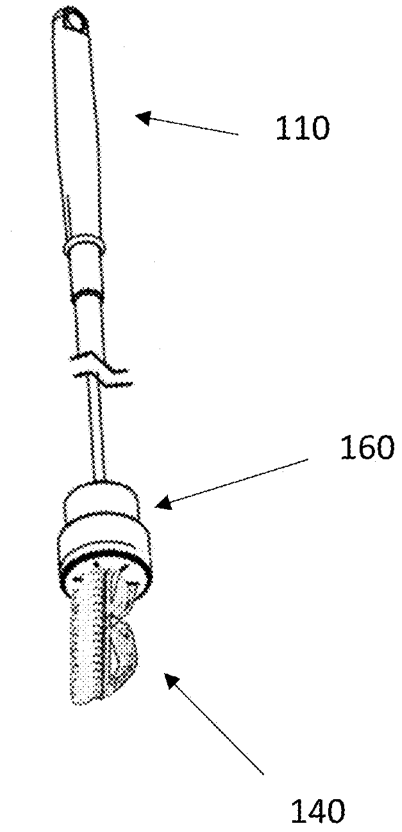
FIG. 5 is a perspective view of the adjustable tool holder with a cleaning brush.

FIG. 5 is a picture of the instant invention with a large/cleaning brush 140, extendable handle 110 and tool attachment holder 160. The user can removably attach the large/cleaning brush 140 to the tool attachment holder 160.

Figure 6:
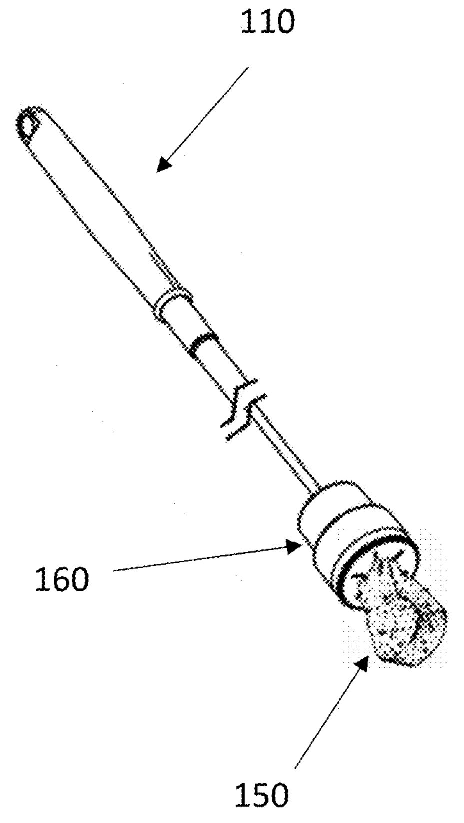
FIG. 6 perspective view of the adjustable tool holder with a sponge.

FIG. 6 is a picture of the instant invention with a sponge 150, extendable handle 110 and tool attachment holder 160. The user can removably attach the sponge 150 to the tool attachment holder 160.

Figure 7:
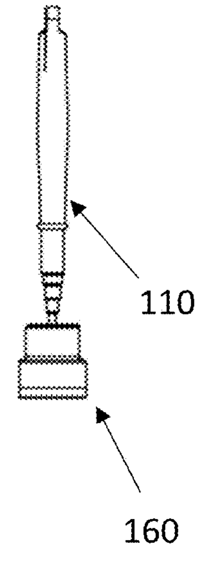
FIG. 7 is a side elevational view of the adjustable tool holder collapsed.

FIG. 7 is a picture of the instant invention with the extendable handle 110 in the collapsed state and the tool attachment holder 160 is at the distal end of the handle. The extendable handle 110 is continuously variable in length from a fully collapsed position whereby the pedicure tool is positioned at a minimum distance from the handle to a fully extended position whereby the pedicure tool is positioned at a maximum distance from the handle.

Figure 8:
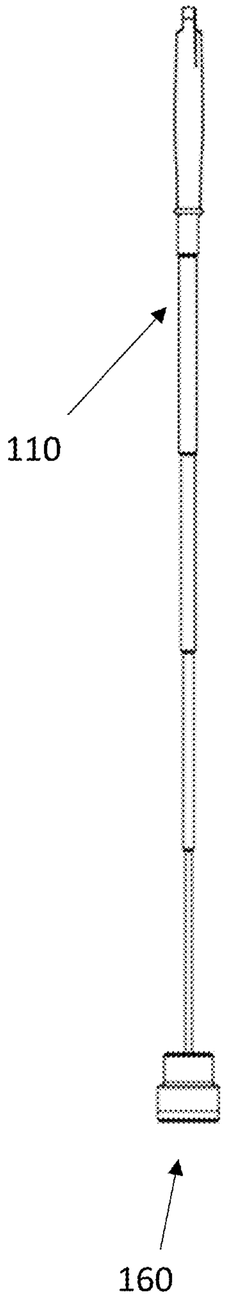
FIG. 8 is a side elevational view of the adjustable tool holder extended.

FIG. 8 is side elevational view of the adjustable tool holder 100 of the instant invention with the extendable handle 110 in the extended state and the tool attachment holder 160 is at the distal end of the handle. The extendable handle 110 is continuously variable in length from a fully collapsed position whereby the pedicure tool is positioned at a minimum distance from the handle to a fully extended position whereby the pedicure tool is positioned at a maximum distance from the handle.

Figure 9:
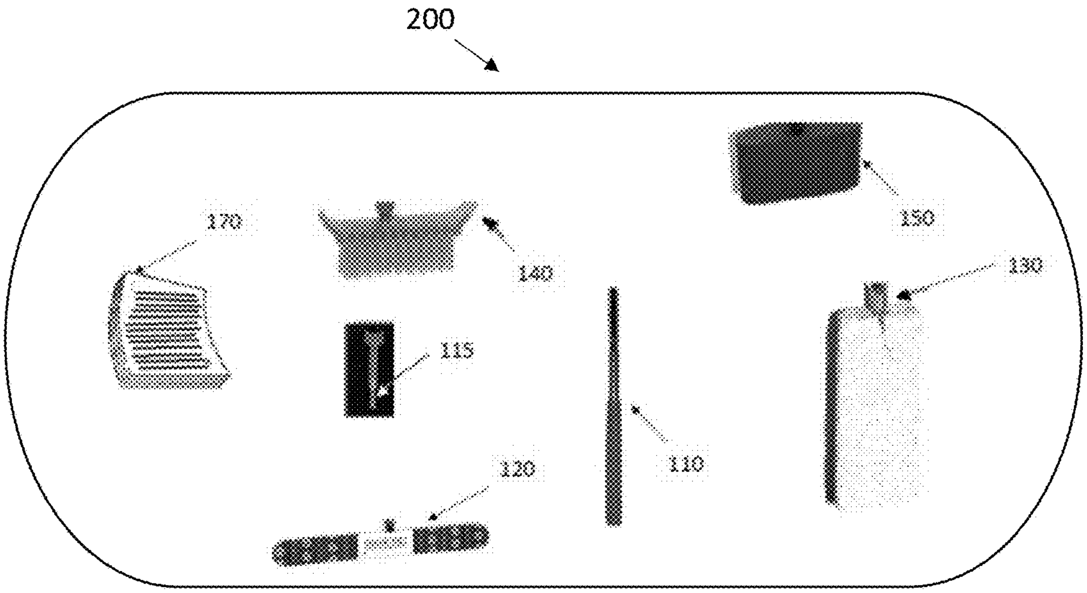
FIG. 9 is a kit of the instant invention.

Another embodiment of the present invention is shown in FIG. 9. A kit 200 includes an extendable handle 110 at least one tool attachable to the extendable handle. Tool which may be included in the kit are a small toenail polish applicator brush 115, an emery board 120, a pumice stone 130, a large/cleaning brush 140 and a sponge 150. A user manual 170 is included in the kit 200. The manual includes instructions on use of the tools and the extendable handle 110.

The user attaches any of the tools as shown in the manual so that the extendable handle 110 is removably attached to either a small toenail polish applicator brush 115, an emery board 120, a pumice stone 130, a large/cleaning brush 140, a sponge 150 to the extendable handle 110 to provide foot care to their feet.

Figure 10:
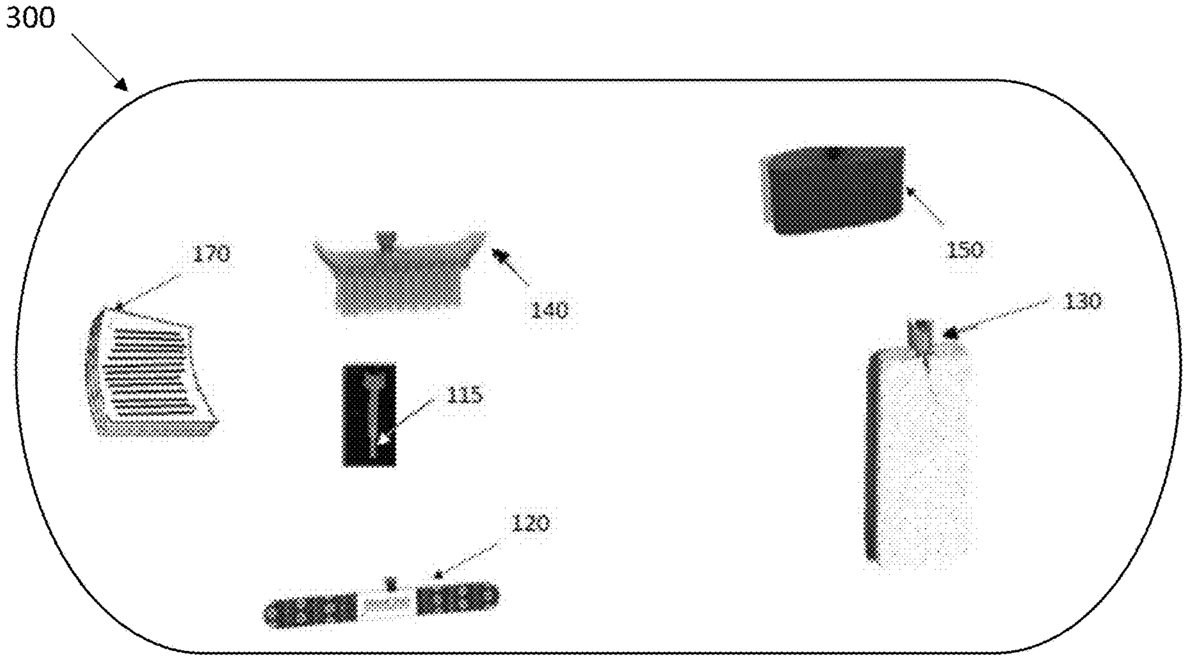
FIG. 10 is an alternate embodiment of the kit shown in FIG. 9.

An accessory kit 300 as shown in FIG. 10 includes the tool for attachment to an extendable handle 110 but the kit 300 does not include the extendable handle 110.

Figure 11:
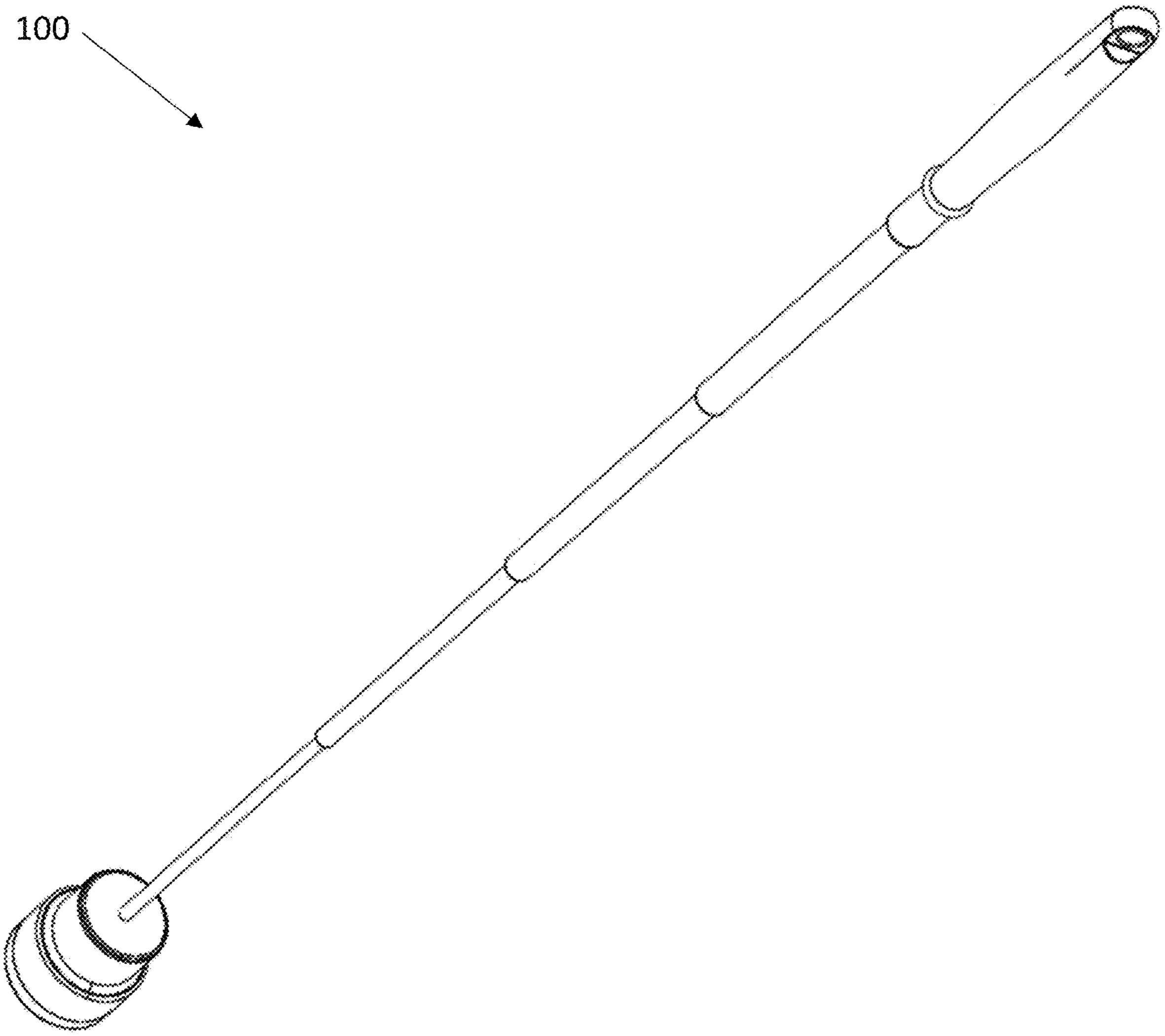
FIG. 11 is a top rear left perspective view of the adjustable tool holder.

FIG. 11 is a top rear left perspective view of the adjustable tool holder 100.

Figure 12:
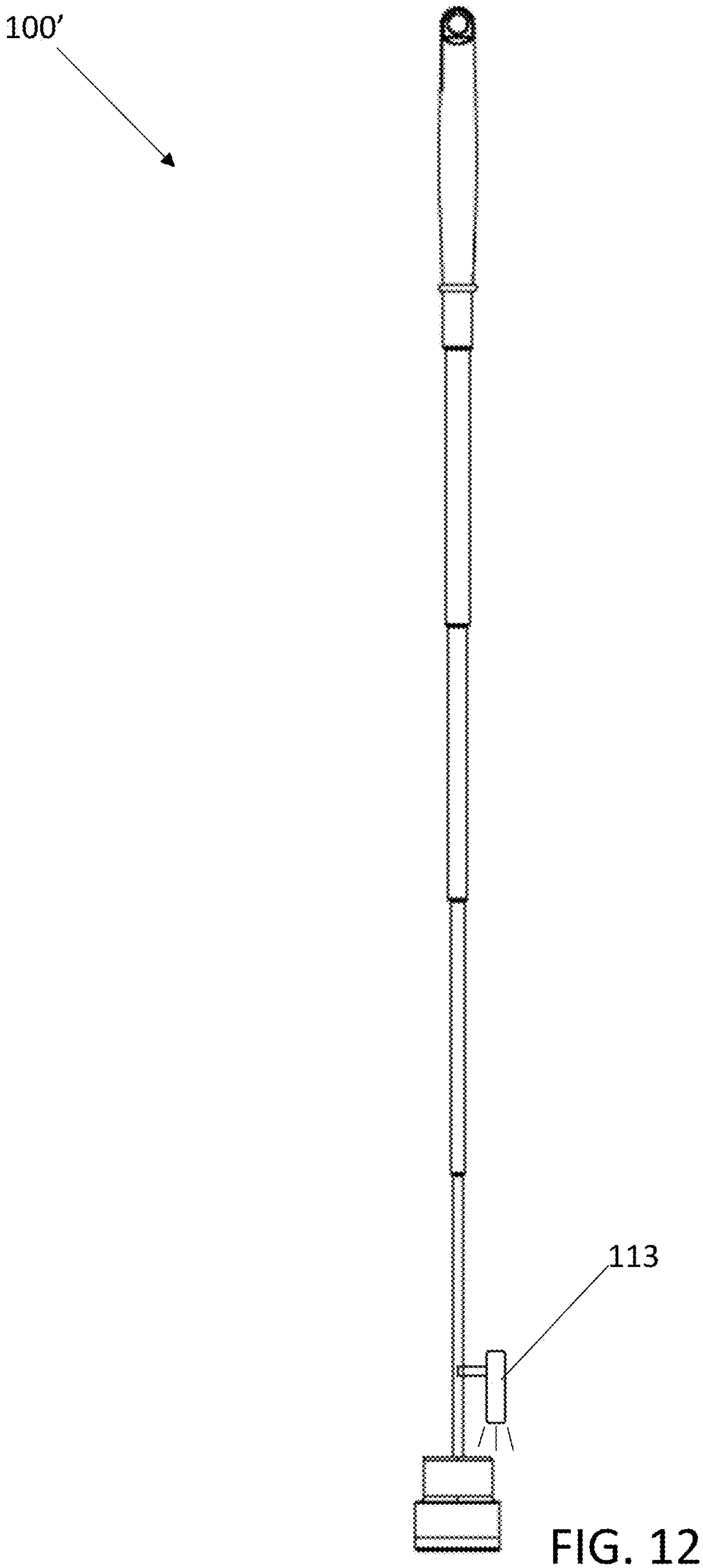
FIG. 12 is front elevational view of the adjustable tool holder.

FIG. 12 is front elevational view of an embodiment of an adjustable tool holder 100' having a LED light source 113 disposed on a bottom portion of the adjustable tool holder with a power source activated from the LED light source 113 or from a remote button an upper portion of the adjustable tool holder 100'.

Figure 13:
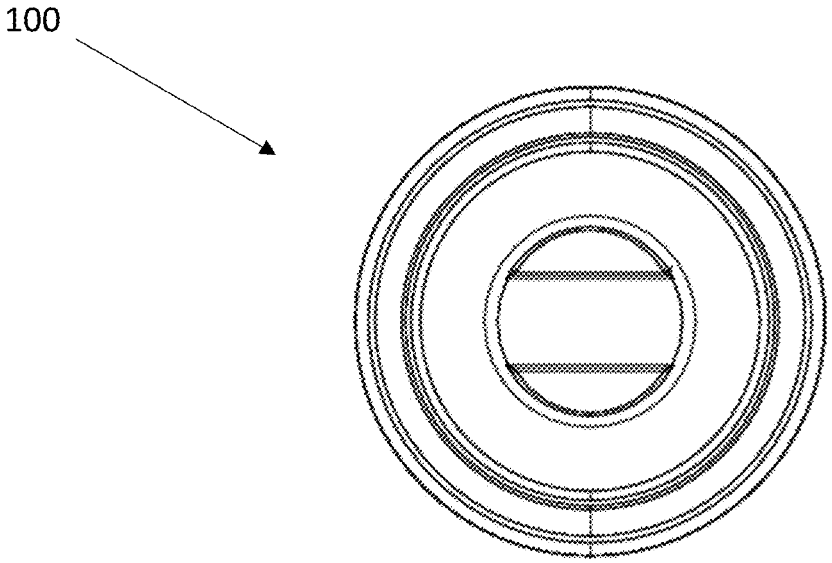
FIG. 13 is a top plan view of the adjustable tool holder.

FIG. 13 is a top plan view of the adjustable tool holder 100.

Figure 14:
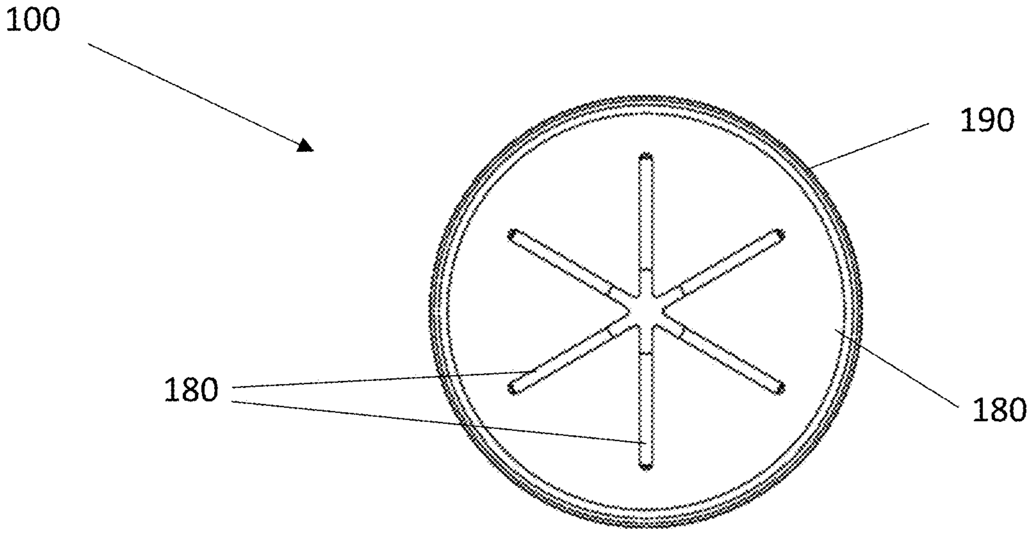
FIG. 14 is a bottom plan view of the adjustable tool holder.

FIG. 14 is a bottom plan view of the adjustable tool holder 100.

Figure 15:
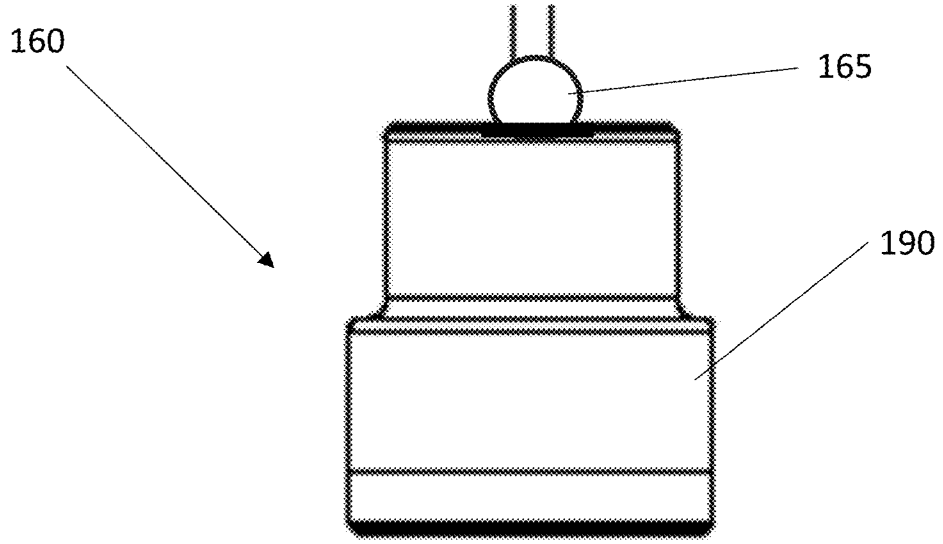
FIG. 15 is an enlarged front elevational view of a bottom portion of the adjustable tool holder.

FIG. 15 is an enlarged front elevational view of a bottom portion of the adjustable tool holder 100.

Figure 16:
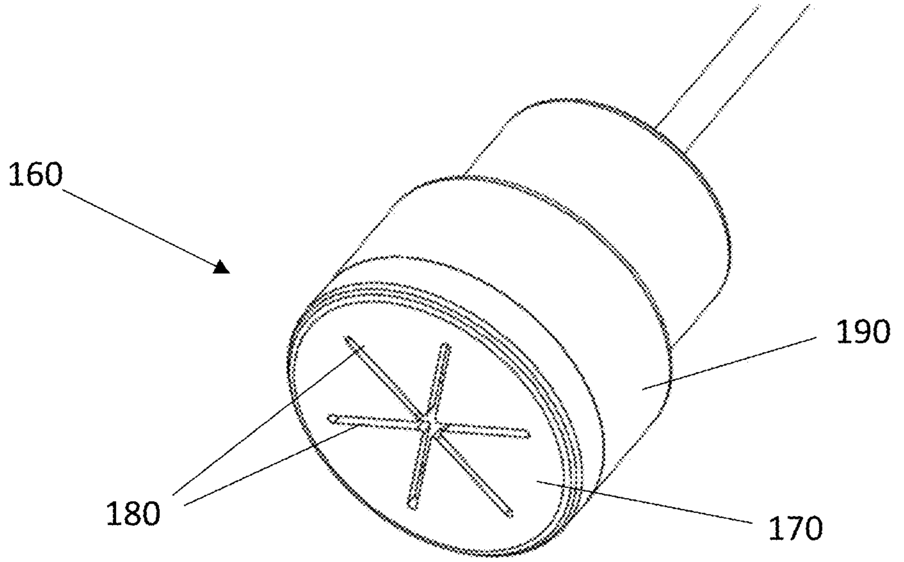
FIG. 16 is an enlarged bottom front left perspective view of a bottom portion of the adjustable tool holder.
Figure 17:
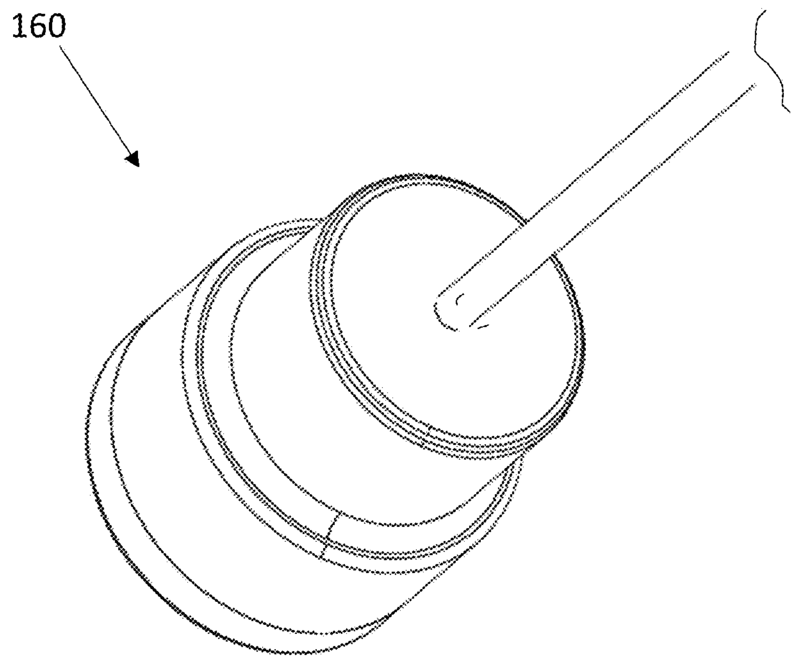
FIG. 17 is an enlarged top rear left perspective view of a bottom portion of the adjustable tool holder.

FIG. 16 is an enlarged bottom front left perspective view of a bottom portion of the adjustable tool holder 100. FIG. 17 is an enlarged top rear left perspective view of a bottom portion of the adjustable tool holder 100. The tool attachment holder 160 is a receptacle for securing an object. The receptacle is preferably a cup having a cylindrical wall 190, although a receptacle of other shapes will provide a tool capable of holding a pedicure accessory. The cylindrical wall 190 could also have varying dimensions, including different diameters and heights, to accommodate different sizes and shapes of items. The receptacle may be constructed from a variety of materials such as plastic, metal, ceramic, or a composite material. The receptacle includes a bottom or base at one end of the cylindrical wall, which could be flat, concave, or convex in shape. The base could be integrally formed with the cylindrical wall or it could be a separate component that is attached to the cylindrical wall using various methods such as welding, adhesive bonding, or mechanical fastening.

The receptacle features a flexible top 170, which may be made from a resilient material such as rubber, silicone, or a flexible plastic. The flexible top has multiple slits 180 that radiate from its center, the number and length of which can vary depending on the size and shape of the item to be held. The slits may be straight, curved, or a combination of both. The resilience of the flexible top is such that it allows a portion of the item to be securely gripped between the slits when the item is pushed into the cup. The degree of resilience could be adjusted by varying the thickness of the flexible top or by using different materials with varying degrees of flexibility.

The telescoping rod is attached to the base of the cup, either directly or via a lockable or resistive swivel joint 165. The telescoping rod may be made from a lightweight material such as aluminum or carbon fiber, and its length may be adjustable to accommodate different heights or angles of use. The swivel joint may be designed to lock at various angles, providing additional flexibility in positioning the cup. The telescoping rod may also be connected to the cylindrical wall of the cup, either directly or via a lockable or resistive swivel joint. This connection may be made at various points along the height of the cylindrical wall, allowing for further customization of the cup's positioning and orientation.

Other tools that may be removably attached the extendable handle 110 include a nail clipper activated remotely, a cuticle scissor activated remotely, a pair of tweezers activated remotely, a cuticle pusher, a cuticle nipper activated remotely and a file. Remote activation may include mechanical activation through a lever on the handle or electrical activation through a button on the lever.

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

In addition, the present invention has been described with reference to embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

Insofar as the description above and the accompanying drawings disclose any additional subject matter that is not within the scope of the claims below, the inventions are not dedicated to the public and the right to file one or more applications to claim such additional inventions is reserved.

Although very narrow claims are presented herein, it should be recognized that the scope of this invention is much broader than presented by the claim. It is intended that broader claims will be submitted in an application that claims the benefit of priority from this application.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A telescopic foot care device for holding at least one foot care tool, comprising:

a telescoping handle having a first end, a handle grip disposed on the first end and a second end opposite the first end; and the handle grip is formed from a non-slip material and the non-slip material having a textured surface;

a magnetic connection tool attachment holder disposed on the second end and said magnetic connection tool attachment holder includes a receptacle having a cavity and a flexible end having a plurality of slits extending radially from a center portion of the flexible end wherein the flexible end allows a portion of the at least one foot care tool to be securely gripped between the slits when the at least one foot care tool is pushed into the receptacle;

wherein the at least one foot care tool is removable disposable in the magnetic connection tool attachment holder; and wherein the telescoping handle is continuously variable in length from a fully collapsed position whereby the at least one foot care tool is positioned at a minimum distance from the handle grip to a fully extended position whereby the at least one foot care tool is positioned at a maximum distance from the handle grip;

the at least one foot care tool is selected from a group consisting of a small toenail polish applicator brush, an emery board, a pumice stone, a large/cleaning brush, and a sponge;

the telescopic foot care device having a light source and a power source and the light source near the second end to illuminate a foot or at least one foot care tool during use when the power source is activated; and the telescopic foot care device having a storage compartment that is removably attached to the telescoping handle and the storage compartment enabled to store the at least one foot care tool.

* * * * *